United States Patent
Goodman et al.

(10) Patent No.: US 6,636,658 B2
(45) Date of Patent: Oct. 21, 2003

(54) WAVELENGTH DIVISION MULTIPLEXING/ DEMULTIPLEXING SYSTEMS

(75) Inventors: Timothy D. Goodman, Windsor, CA (US); Janeen Cooke, Clarksville, MD (US); Clive Egerton, Santa Rosa, CA (US)

(73) Assignee: Optical Coating Laboratory, Inc., Santa Rosa, CA (US)

( * ) Notice: Subject to any disclaimer, the term of this patent is extended or adjusted under 35 U.S.C. 154(b) by 176 days.

(21) Appl. No.: 09/840,636

(22) Filed: Apr. 23, 2001

(65) Prior Publication Data

US 2002/0154857 A1 Oct. 24, 2002

(51) Int. Cl.$^7$ ................................................. G02B 6/28
(52) U.S. Cl. ........................................... 385/24; 385/47
(58) Field of Search ...................................... 385/24, 47

(56) References Cited

U.S. PATENT DOCUMENTS

| | | | |
|---|---|---|---|
| 4,244,045 A | 1/1981 | Nosu et al. ...................... 370/3 |
| 4,441,784 A | 4/1984 | Korth ....................... 350/96.15 |
| 4,449,782 A | 5/1984 | Korth ....................... 350/96.16 |
| 4,482,994 A | 11/1984 | Ishikawa ........................ 370/3 |
| 4,675,860 A | 6/1987 | Laude et al. .................... 370/3 |
| 4,740,951 A | 4/1988 | Lizet et al. ..................... 370/3 |
| 4,824,200 A | 4/1989 | Isono et al. .............. 350/96.16 |
| 4,993,796 A | 2/1991 | Kapany et al. .......... 350/96.15 |
| 5,071,225 A | 12/1991 | Inoue |
| 5,119,454 A | 6/1992 | McMahon |
| 5,808,763 A | 9/1998 | Duck et al. ................. 359/127 |
| 5,943,456 A | 8/1999 | Buchholz et al. ............. 385/24 |
| 6,005,718 A | 12/1999 | Park et al. |
| 6,008,920 A | 12/1999 | Hendrix ....................... 359/127 |
| 6,072,633 A | 6/2000 | Park et al. |
| 6,075,632 A | 6/2000 | Braun |
| 6,147,806 A | 11/2000 | Park et al. |
| 6,198,864 B1 | 3/2001 | Lemoff et al. ................. 385/47 |
| 6,292,298 B1 | 9/2001 | Glance |
| 6,385,366 B1 * | 5/2002 | Lin .............................. 385/24 |
| 6,404,948 B2 * | 6/2002 | Alexander et al. ............. 385/24 |
| 6,493,141 B2 * | 12/2002 | Cao et al. .................... 359/497 |

FOREIGN PATENT DOCUMENTS

EP    1004907    5/2000

OTHER PUBLICATIONS

Ishio, H., Minowa, J. and Nosu, K., "Review and Status of Wavelength–Division–Multiplexing Technology and Its Application," Journal of Lightwave Technology, vol. LT–2, No. 4, pp. 448–463, Aug. 1984.

(List continued on next page.)

*Primary Examiner*—Hung N. Ngo
(74) *Attorney, Agent, or Firm*—Holme Roberts & Owen LLP

(57) ABSTRACT

A multiple channel optical multiplexing/demultiplexing system utilizes a beam splitter to divide a single multi-wavelength beam of optical energy into two multi-wavelength beams, or to combine a plurality of multi-wavelength beams into a single output beam. In the demultiplexing configuration, a pair of demultiplexers are configured to receive and separate the two multi-wavelength beams into a plurality of wavelength channels. The two multi-wavelength beams are thus demultiplexed in parallel, allowing greater efficiency by avoiding excess beam attenuation. The individual demultiplexers can be incorporated into a single unitary device or can be optically interconnected as separate parts. Alternatively, the demultiplexing system can use multiple beam splitters to divide a single input multi-wavelength beam into a plurality of multi-wavelength beams for parallel demultiplexing in a plurality of demultiplexers.

48 Claims, 4 Drawing Sheets

OTHER PUBLICATIONS

Hendricks, H.D., "*A Four Channel 10–Nanometer Spacing Wavelength Demultiplexer*," Fiber Optics Multiplexing and Modulation; Proceedings of Meeting, Arlington, VA, Apr. 7, 1983, SPIE 417, 5–11 (1983).

Hendricks, H.D., "*Wavelength Division Multiplexing*," Fiber Optics Communications Technology, Proceedings of the Meeting, San Diego, CA, Aug. 23–24, 1984, SPIE 512, 130144 (1984).

Nosu, K., Ishio, K., and Hashimoto, K., "*Multireflection Optical Multi/Demultiplexer Using Interference Filters*," Electronic Letters 15, 414–415 (1979).

Buckman, L., Lemoff, B., and Dolfi, D, "*A Low–Cost Compact Multimode/Singlemode WWDM Transceiver Module for 10–Gb/s Applications*," Agilent Laboratories, WE2–1, pp. 67–69.

Lemoff, B., Buckman, L., Schmit, A., and Dolfi, D., "*A Compact, Low–Cost WDM Transceiver for the LAN*," 2000 Electronic Components and Technology Conference, Sep. 2000, pp. 711–716.

Lemoff, B., "*Tutorial: Technology Alternatives for 10 Gbit/sec LANS (Cat. E)*," Optical Fiber Communication, Mar. 8, 2000, 146–WI1–1.

Lemoff, B., "*Technology Alternatives for 10Gbit/s LANS*," OFC 2000 Tutorials, Mar. 9, 2000, 100–124.

\* cited by examiner

WAVELENGTH DIVISION MULTIPLEXING/ DEMULTIPLEXING SYSTEMS

BACKGROUND OF THE INVENTION

1. Field of the Invention

The present invention relates to multiple channel multiplexers and demultiplexers for fiber optic systems. In particular, the present invention relates to wavelength division multiplexer/demultiplexer systems that provide parallel multiplexing/demultiplexing of a multiple channel optical signal.

2. Background Technology

The increasing demand for bandwidth, coupled with the high cost of laying new optical fiber, has created a strong demand to find new and better ways to increase the carrying capacity on existing optical fiber systems. One such way to increase the capacity is by a technique called wavelength division multiplexing (WDM), which employs multiple wavelengths to carry multiple signal channels and thereby greatly increase the capacity of installed fiber optic networks.

Wavelength division multiplexing (WDM) technology has become a vital component of optical communication systems. In a WDM optical system, light from several lasers, each having a different central wavelength, is combined into a single beam that is introduced into an optical fiber. Each wavelength is associated with an independent data signal through the optical fiber. At the exit end of the optical fiber, a demultiplexer is used to separate the beam by wavelength into the independent signals. In this way, the data transmission capacity of the optical fiber is increased by a factor equal to the number of single wavelength signals combined into a single fiber.

A demultiplexer (DEMUX) device is designed to selectively direct several channels from a single multiple-channel input beam into separate output channels and a multiplexer (MUX) device provides a single multiple-channel output beam comprising the combinations of a plurality of separate input beams. A multiplexer-demultiplexer (MUX/DEMUX) device operates in either the multiplexing or demultiplexing mode depending on its orientation in application, i.e., depending on the choice of direction of the light beam paths through the device.

Thus, in a WDM system, optical signal channels are: (1) generated by light sources; (2) multiplexed to form an optical signal constructed of the individual optical signal channels; (3) transmitted over a single waveguide such as an optical fiber; and (4) demultiplexed such that each channel wavelength is individually routed to a designated receiver such as an optical detector.

Generally, applications for MUX/DEMUX technology include long haul communications and local area data networks. Both digital and analog systems have been demonstrated for voice, data and video. The scope of applications for WDM devices ranges from spacecraft and aircraft applications to closed circuit and cable television systems. In view of these diverse applications, much effort has been expended toward developing WDM technology.

Wavelength selectivity in MUX/DEMUX devices may be achieved through the use of the wavelength-selective characteristics of optical thin film interference filters, such as high and low bandpass filters and dichroic filters. Wavelength selectivity may also be achieved with angularly dispersive devices including prisms and various diffractive grating devices, e.g., prism grating devices, linear grating devices, and chirped grating devices. The grating devices may be of the Littrow-type, which uses a common lens of either a conventional lens type or a graded index (GRIN) rod lens type. No-lens systems are also known and may have, for example, only a concave grating or a combination of a slab waveguide with a grating device. Combinations of grating devices and optical filters are also known.

Conceptually, each wavelength channel in an optical fiber operates at its own data rate. In fact, optical channels can carry signals at different speeds. The use of WDM can push total capacity per fiber to hundreds of gigabytes per second. Generally, more space is required between wavelength channels when operating at 10 gigabytes per second than at 2.5 gigabytes per second, but the total capacities are nonetheless impressive. For example, in the case of 4 wavelength channels at a data rate per channel of 2.5 gigabytes per second, a total data rate of 10 gigabytes per second is provided. With 8 wavelength channels at a data rate per channel of 2.5 gigabytes per second, a total data rate of 20 gigabytes per second is provided. In fact, other wavelength channels can include, for example, 16, 32, 40, or more wavelength channels operating at 2.5 gigabytes per second or 10 gigabytes per second and allow much higher data transfer possibilities. Further, the use of multiple fibers in a single cable can provide even higher transmission rates.

Optical WDM networks typically allocate a portion of the spectrum about a center frequency of the nominal channel wavelength for signal transmission. For example, in dense wavelength division multiplexing (DWDM) systems, channel spacings of less than 1 nm are typically used with wavelength bands centering around 1550 nm. Other systems may require or allow narrower or wider channel widths or spacings. Whereas DWDM is commonly used in telecommunications where the dense channel spacing is ideal, DWDM is normally incompatible with local network data transfer because the narrow channel spacing leads to excessive crosstalk that is unacceptable in data transfer applications.

One solution to crosstalk and channel separation problems in local area networks (LAN), metropolitan area networks (MAN), and wide area networks (WAN) is wide wavelength division multiplexing (WWDM), which is an industry-defined term that indicates narrow bands of wavelengths that are spaced relatively far apart. Typically, the wavelength bands are about 10 nanometers (nm) wide and are spaced about 25 nm apart. The wavelength bands in WWDM bands are centered at about 1310 nm and typically contain four channels at 1275 nm, 1300 nm, 1325 nm, and 1350 nm, each within about ±5 nm of the designated wavelength. WWDM can be expanded to up to 100 gigabytes per second or more. Nevertheless, when more than 4 wavelengths, for example 8 or 16, are multiplexed, the demultiplexing needs become greater and the accompanying risk of excessive beam attenuation heightens.

An advantage of the wide channel spacing in WWDM is that it requires no temperature control over the range of 0° C. to 70° C. This is because, although laser wavelengths may drift by a few nanometers over the range of 0° C. to 70° C., WWDM has an acceptable wavelength variation of ±5 nm. Therefore, WWDM is not particularly limited by temperature conditions.

Similar to WWDM, coarse wavelength division multiplexing (CWDM) is another industry-defined term and is a solution to crosstalk and channel spacing problems. CWDM denotes wavelength bands that are about 10 nm wide and are spaced about 20 nm apart. The CWDM bands are centered at about 850 nm and about 1550 nm.

The 10-gigabit per second Ethernet standard (GbE) is based upon WWDM technology. However, the standard has numerous challenges. Various solutions have been proposed for the 10 GbE standard, including WWDM using multiple wavelength lower speed lasers. Currently, the 10 GbE industry is standardizing on a physical layer transceiver that incorporates WWDM technology. On the transmitter side, the standard uses a multiplexer that combines the output from four lasers at 1,310 nanometers and launches them into an optical fiber. On the receiver side there is a demultiplexer that has an input fiber for the four wavelengths or channels and an optical system with color separation capabilities to divide the four channels. The 10 GbE standard provides physical air solutions to support 65 meters on installed multimode fiber, 300 meters on multimode fiber, 2 kilometers on single mode fiber, 10 kilometers on single mode fiber, and 40 kilometers on single mode fiber. It should be noted that the WWDM physical medium dependent (PMD) solution (10 GBASE-LX4) is the only solution that meets all distance objectives of 10 km or less.

One example of a demultiplexer device is disclosed in U.S. Pat. No. 4,993,796 to Kapany et al. (hereinafter "Kapany"), which discloses discrete modules for interfacing optical fibers. Kapany discloses the use of concave gratings and dichroic beam splitters to demultiplex multi-channel beams. However, this approach suffers from several disadvantages. First, a single discrete element is practically limited to two channels. To get more than two channels, these discrete components must be daisy chained together with optical fibers. Second, the method described using dichroic coatings for color separation requires double transmission through the coating for transmitted wavelengths. Third, the method described using dichroic coatings for color separation requires coatings on highly curved spherical surfaces. Fourth, the method described using dichroic coatings for color separation requires the assembly and the precise alignment of several discrete optical elements, many of which are highly curved spherical surfaces.

U.S. Pat. No. 4,441,784 to Korth (hereinafter "Korth") discloses the use of a beam splitter in a paraboloid coupler circuit. Korth discloses the use of two paraboloids that are cut perpendicular to their axis of symmetry. The resulting sectional faces are positioned facing each other with an optical element such as a beam splitter or optical filter inserted therebetween. Optical fibers are inserted at various points on each parabolic surface. Light is emitted from one optical fiber and is reflected to another optical fiber within the same paraboloid or transmitted to a receiving fiber on the opposing paraboloid. This approach is limited to couplers using optical fibers to relay the optical signals.

One way to increase the data transfer capability of optical fibers is to add additional optical channels. The current understanding of how to increase the number of optical channels in a multiplexer/demultiplexer device consists of adding additional multiplexer/demultiplexer elements in series. Unfortunately, this approach is limited by several drawbacks. As light beams travel within a demultiplexer, they are attenuated by a variety of mechanisms. For example, in a polymeric-based demultiplexer the beam is attenuated by the polymeric material as it travels within the demultiplexer. As more optical channels are demultiplexed in series, the beam must travel a greater distance through the polymeric material, thus increasing the beam attenuation. Also, each reflection in an optical path, whether it is from a reflective surface or a filter surface is less than one hundred percent because Fresnel reflection losses at each surface interface reduce the overall beam intensity. If the overall beam attenuation becomes too high, the optical channels can no longer be reliably demultiplexed and the number of channels to be separated must be limited.

Accordingly, there is a need for improved multiplexing and demultiplexing devices and methods that overcome the above drawbacks.

SUMMARY AND OBJECTS OF THE INVENTION

It is an object of the present invention to provide a compact, cost effective demultiplexing system that can meet the wavelength demultiplexing requirements for a 10 Gb/sec or faster optical transceiver.

It is a further object of the present invention is to provide a demultiplexer device capable of separating multiple wavelength channels with minimal attenuation.

Another object of the invention is to provide a demultiplexer device capable of separating numerous multiple wavelength channels.

To achieve the forgoing objects and in accordance with the invention as embodied and broadly described herein, multiple channel optical multiplexing/demultiplexing systems are provided which have the property of allowing multiplexing/demultiplexing of a single multi-wavelength beam to occur in parallel by dividing an input multiple wavelength beam into two separate multi-wavelength beams.

In one embodiment, a multiple channel optical demultiplexing system utilizes a beam splitter to divide a single multiple wavelength beam of optical energy into two multi-wavelength beams. A pair of demultiplexers are configured to receive and separate the two multi-wavelength beams into a plurality of wavelength channels. The two multi wavelength beams are thus demultiplexed in parallel, allowing greater efficiency by avoiding excess beam attenuation. The individual demultiplexers can be incorporated into a single unitary device or can be optically interconnected as separate parts.

In another embodiment, the demultiplexing system can use multiple beam splitters to divide a single input multiple wavelength beam into multi-wavelength beams for parallel demultiplexing in a plurality of demultiplexers.

The embodiments of the present invention can also be used as multiplexing systems by reversing the direction of the multiple channel beams. Thus, a multiplexing system according to the invention includes a first multiplexer configured to receive and combine a first plurality of wavelength channels into a first multi-wavelength beam, and a second multiplexer configured to receive and combine a second plurality of wavelength channels into a second multi-wavelength beam. A beam splitter is in optical communication with the first and second multiplexers and is adapted to combine the first multi-wavelength beam with the second multi-wavelength beam to produce an output multiple wavelength beam.

The foregoing objects and features of the present invention will become more fully apparent from the following description and appended claims, or may be learned by the practice of the invention as set forth hereinafter.

BRIEF DESCRIPTION OF THE DRAWINGS

In order to illustrate the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

The present invention is directed to multiple channel multiplexing/demultiplexing (MUX/DEMUX) systems and devices, and in particular to multiple channel demultiplexing systems and devices for use in optical fiber systems. The demultiplexing systems and devices of the invention are particularly suited for use in wide wavelength division multiplexing (WWDM) systems.

A MUX/DEMUX device can operate in either or both directions depending on the direction of travel of light through the device. An optical demultiplexer device demultiplexes, i.e., spatially disburses, multiple wavelength light from a fiber optic waveguide or other optical source into separate and different wavelength bands. An optical multiplexer combines separate wavelength bands into a single multiple wavelength beam of light. Although, for simplicity and convenience, the demultiplexing functionality is predominantly focused upon in the discussion below, it will be appreciated that this focus is not to be construed as limiting, since the described embodiments can function as multiplexers or demulitplexers. Nevertheless, unless stated otherwise, for simplicity the remainder of the discussion will refer to the invention only in the demultiplexing sense.

The systems and devices of the present invention generally employ a beam splitter for separating an input multiple channel beam into a first multi-wavelength beam and a second multi-wavelength beam. For example, in the case of eight channels (i.e., eight wavelengths) at the input, four channels are directed to one four channel demultiplexer while the other four channels are directed to a second four channel demultiplexer device. With this parallel scheme, the first set of four channels has almost the same attenuation as the second four channels since the optical paths and the number of reflections will be approximately the same. In the case of sixteen channels at the input, two eight channel beams are each directed to two different eight channel demultiplexers. These eight channel demultiplexers could each be eight channel serial demultiplexers, or two four channel demultiplexers in parallel. The present parallel demultiplexing system could be extended greatly in theory, but has a practical limit based on acceptable signal loss, channel separation, and wavelength space.

Figure 1:
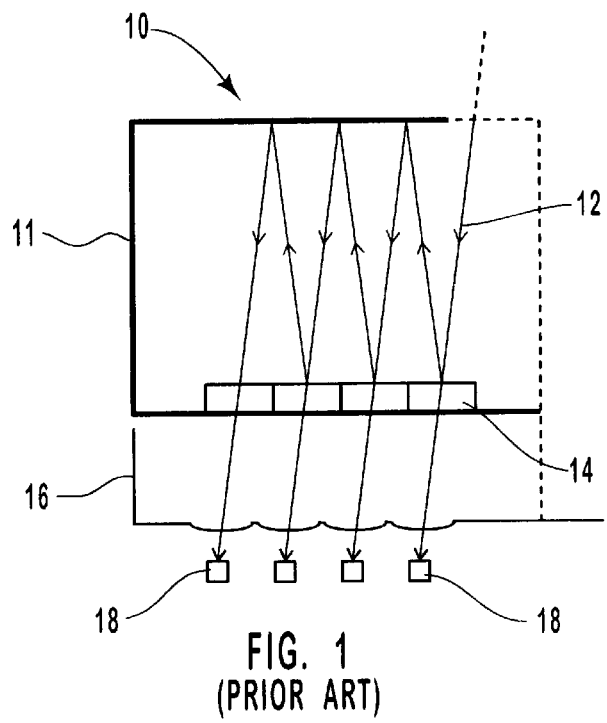
FIG. 1 is a schematic representation of a conventional demultiplexer.

Referring to the drawings, wherein like structures are provided with like reference designations, FIG. 1 schematically illustrates a portion of a conventional four-channel demultiplexer 10 that provides a zigzag optical path for WDM demultiplexing. The term "zigzag" as used herein refers to a series of short sharp turns in a path taken by a light beam. The demultiplexer 10 can be encased in a bulk polymer material forming an optical block 11. In the demultiplexer 10, a four channel multi-wavelength beam of optical energy 12 is separated into four distinct channels by a series of wavelength selective filters 14 as the beam travels a zigzag path through demultiplexer 10. Each filter 14 transmits a selected wavelength band and reflects the remainder. Relay mirrors positioned opposite the filters can be used to enhance the travel of the beam through optical block 11 by receiving the multi-wavelength beam from one filter and relaying it to the next filter in the series. The selected wavelength bands transmitted by each filter 14 are directed into a lens array 16 that focuses each selected band onto a respective optical detector 18.

In conventional zigzag demultiplexers, each wavelength selective filter has an associated transmission loss and reflection loss. As in all WDM devices, the optical signal typically needs to be kept at or above a minimum amplitude, and losses can accumulate from a variety of sources. It is generally desirable to minimize the amount of gain needed to maintain a signal at the desired level because higher gain typically requires higher pumping power and often injects more noise.

Under the current understanding of zigzag bulk polymer technology, the addition of more channels is accomplished by extending the zigzag pattern and adding more filters and channels in series. The major limitation with this approach is beam attenuation and assembly tolerances. For example, as the optical path length increases, the alignment tolerances for the optical elements becomes very tight. Since the beam is contained in the polymer material, a small amount of absorption by the polymer causes attenuation of the beam. Also, each reflection in the optical path, whether it is from a reflective surface or a filter surface is less than one hundred percent. Fresnel reflection, which is the reflection of a portion of light resulting when light is incident upon an interface between materials that have different refractive indices, is another source of beam attenuation. Fresnel reflection depends upon the refractive index difference and the angle of incidence. Additionally, the beam is attenuated by the engineered filter transmission. Thus, for example, the first channel in the demultiplexer is attenuated by polymer absorption, inefficient reflections, fresnel reflections, and filter transmission. Each subsequent channel not only has these loss mechanisms, but also losses from the increasing path length through the polymeric material and the number of reflections. This means that channels that travel further through the demultiplexer before exiting have more signal loss than prior channels. The actual total beam attenuation will vary depending upon the application.

Figure 2:
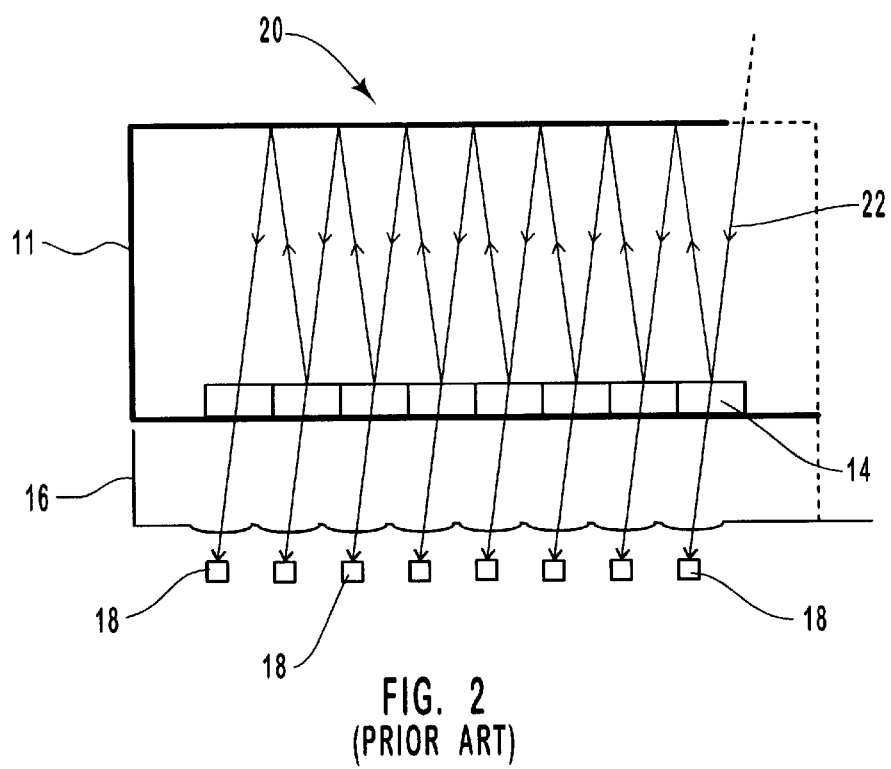
FIG. 2 is a schematic representation of another conventional demultiplexer.

FIG. 2 depicts a portion of a prior eight-channel demultiplexer 20, which demonstrates the conventional understanding of how to increase the number of wavelength channels that can be demultiplexed in a zigzag bulk polymer demultiplexer. Essentially, this approach is to add additional filters 14 in series so that the multiplexed beam of optical energy 22 travels further through an optical block 11 to sequentially reach the additional filters 14. Each filter 14 transmits a selected wavelength band and reflects the remainder along the optical path. The selected wavelength bands transmitted by each filter 14 are directed into a lens array 16 that focuses each band onto an optical detector 18. This approach, however, also leads to increased beam attenuation and tighter alignment tolerances. Each additional surface the beam impacts upon and each length of polymer the beam travels through increase the net beam attenuation.

Figure 3:
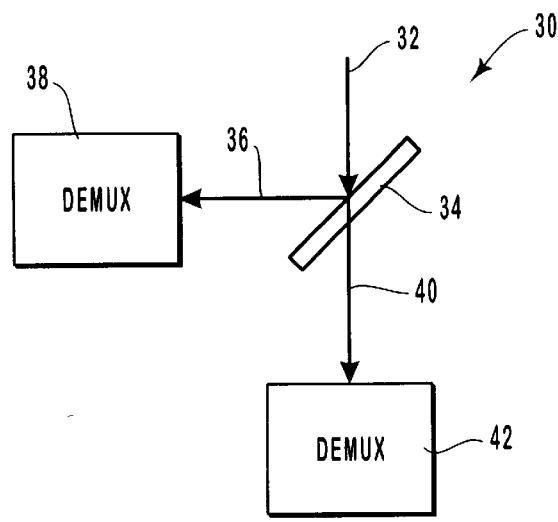
FIG. 3 is a schematic diagram depicting the operation of a demultiplexer system according to one embodiment of the present invention.

The present invention provides demultiplexing systems and devices that increase the number of wavelength channels that can be effectively demultiplexed from a single input multi-wavelength beam while minimizing beam attenuation. FIG. 3 is a schematic diagram that depicts a demultiplexing system 30 according to the present invention which provides parallel demultiplexing of a multi-wavelength beam of optical energy. The system 30 includes means for separating an input multiple wavelength beam into a first multi-wavelength beam and a second multi-wavelength beam. For example, as shown in FIG. 3, the beam separating means can be a beam splitter 34 positioned along the optical path of an input multiple wavelength optical energy beam 32. The system 30 also includes means for demultiplexing the first and second multi-wavelength beams into a plurality of wavelength channels. For example, a first demultiplexer 38 and a second demultiplexer 42 are positioned with respect to beam splitter 34 so as to receive portions of the beam separated by beam splitter 34. The beam splitter 38 and the demultiplexers 38, 42 are discussed in further detail hereafter.

During operation of system 30, beam 32 is directed to beam splitter 34. A first multi-wavelength beam 36 containing a first set of wavelength channels is reflectively directed by beam splitter 34 to first demultiplexer 38. A second multi-wavelength beam 40 containing a second set of wavelength channels is transmitted through beam splitter 34 to second demultiplexer 42. The demultiplexer 38 separates selected wavelength channels from beam 36, while demultiplexer 42 separates selected wavelength channels from beam 40. The separated wavelengths can then be directed to appropriate optical receptors (not shown) such as optical detectors.

The demultiplexing system 30 can be configured to separate various numbers of wavelength channels, such as at least 8 or 16 wavelength channels, from the input multiple wavelength beam, with the first and second multi-wavelength beams separated by the beam splitter each containing at least 4 or 8 wavelength channels, respectively. It should be understood that the demultiplexing system 30 can be configured to demultiplex greater or fewer numbers of channels as well. For example, such a system can be configured to demultiplex at least about 5 channels from an input multiple wavelength beam and up to about 40 channels or more.

The beam splitter 34 is generally a mirror that is configured to reflect part of the beam while transmitting part of the beam. The beam splitter generally transmits a contiguous portion of the multi-wavelength optical signal spectrum containing a single channel or several adjacent channels (i.e., a "segment" of the transmission spectrum) along one optical path, and reflects the remainder of the optical signal spectrum to another optical path.

The beam splitter can take the form of a slab beam splitter, a cube beam splitter, a prism beam splitter, an integrated beam splitting surface, and the like. It should be noted that most non-absorbing beam splitters can be operated in reverse to combine two or more separate beams.

In one preferred embodiment, the beam splitter is a dichroic beam splitter. A dichroic beam splitter is essentially an edge filter that divides an incident multi-wavelength beam into two separate beams, each having a different segment of the original spectral distribution such as blue and red wavelengths, which are either transmitted or reflected. Polarizing problems can occur because optical energy passes through the splitter at near Brewter's angle, typically passing at a 45 degree angle of incidence. Therefore, the splitters used in the invention can be non-polarizing, such as a non-polarizing dichroic beam splitter.

A special form of a dichroic beam splitter useful in the present invention is called a "trichroic" or "notch" splitter. The trichroic splitter reflects a narrow band in the center of a defined wavelength zone while transmitting adjacent bands at both longer and shorter wavelengths. The transmitted adjacent bands can then be further separated with a dichroic beam splitter.

Other examples of suitable beam separating means include an interleaver which splits alternate wavelengths of a beam in an optical signal spectrum along different optical paths, and a polarizing beam splitter in combination with other polarizing optics which separates optical channels based on polarization of light.

Other beam separating means that could be used in place of the beam splitter include channel selective (i.e., bandpass) filters, and low-pass or high-pass filters. The terms "low-pass" and "high-pass" refer to low and high frequencies, which correspond to longer and shorter wavelengths, respectively. Alternatively, other filters could be used, such as fiber Bragg grating filters. Such filters might reflect, rather than transmit, the first selected portion of the band, and utilize optical isolators or directional couplers to manage signal flow, rather than the transmission/reflection characteristics of a beam splitter.

Figure 4:
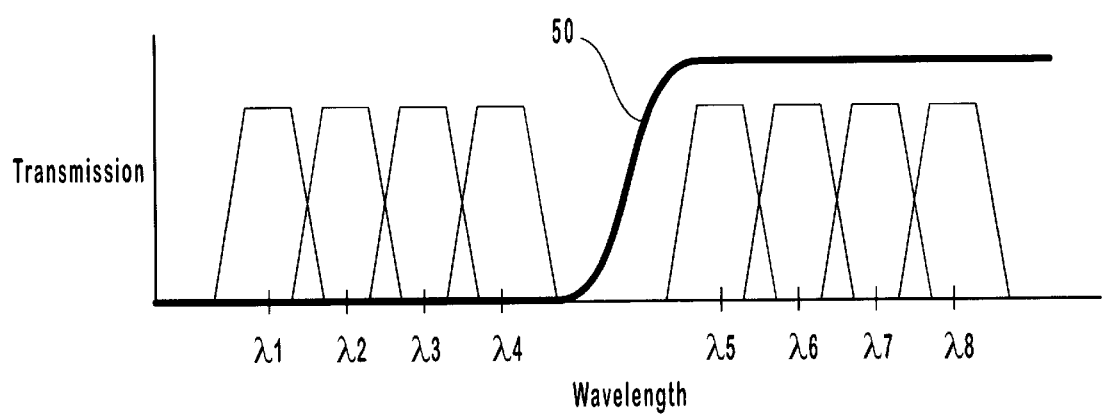
FIG. 4 is a plot demonstrating the wavelength transmission and reflection ranges for a dichroic beam splitter useful in the present invention.

FIG. 4 graphically demonstrates the wavelength division, including wavelength transmission and reflection ranges, effected by a dichroic beam splitter useful in the present invention. Wavelength channels $\lambda 1$–$\lambda 8$ are plotted against the beam splitter transmission at those wavelengths. A cutoff point 50 on the graph of FIG. 4 is the point at which optical energy transmission increases from near zero to near complete. As shown in the graph, at wavelengths shorter than the cutoff point of the beam splitter, reflection of the wavelengths $\lambda 1$–$\lambda 4$ occurs while wavelengths $\lambda 5$–$\lambda 8$ are transmitted. At wavelengths longer than the cutoff point, all incident beams are transmitted by the beam splitter. Therefore, $\lambda 5$–$\lambda 8$ are transmitted by the beam splitter while $\lambda 1$–$\lambda 4$ are reflected. Thus, the beam splitter would divide an eight channel multiplexed beam into two multi channel beams of four channels each. For example, $\lambda 1$–$\lambda 4$ could correspond to four shorter "blue" wavelength channels which are reflected by the beam splitter, while $\lambda 5$–$\lambda 8$ could correspond to four longer "red" wavelength channels which are transmitted. The separated "blue" and "red" channels can then be further separated into individual wavelength channels by a pair of demultiplexers.

Figure 5:
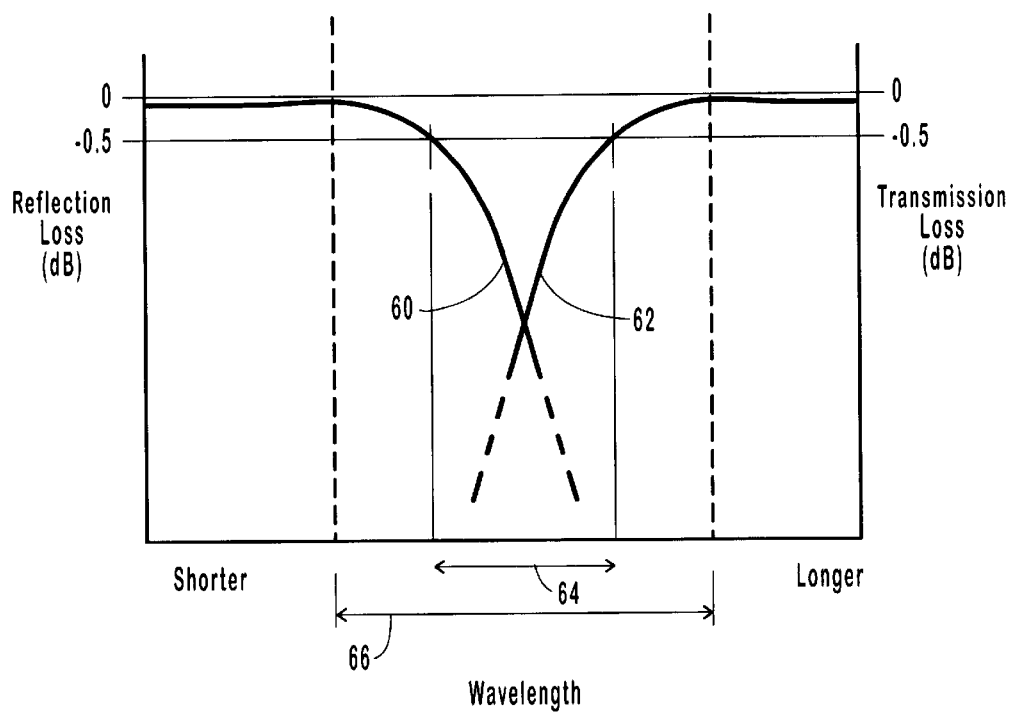
FIG. 5 is a plot demonstrating an idealized frequency characteristic of a dichroic beam splitter useful in the present invention.

FIG. 5 is a graphical representation of an idealized frequency characteristic of a dichroic beam splitter useful in the present invention. The shorter wavelengths indicated by curve 60 are reflected to the first demultiplexer, for example, while the longer wavelengths indicated by curve 62 are transmitted to the second demultiplexer. Alternatively, the longer wavelengths could be reflected while the shorter wavelengths are transmitted. The beam splitter characteristically includes a transition region or band 64 between the lower and higher wavelengths. It is generally desirable that no signals are present in the portion of the spectrum where the beam splitter is transitioning from low to high frequency characteristics because of the overlapping slope of the frequency characteristics in this region. It is further generally desirable to allow for variations in the beam splitter frequency characteristics arising from process variations in splitter fabrication, thermal drift, and the like. Accordingly, a center segment 66 of the spectrum of the input signal selected to pass through the beam splitter and not used to carry any channels is preferably greater than the width of transition band 64. Those skilled in the art will appreciate that the "center segment" does not need to be centered according to the input band or channel allocation, but that it is generally chosen to allow selection of an appropriate beam splitter.

In one embodiment of the invention, a non-polarizing dichroic beam splitter can be used to separate channels within a given transmission band such as the "C" or "L" band in a zigzag beam path DWDM system with band pass filters. The beam splitter could also be used to separate the different C and L bands. For example, a single fiber could be carrying data on both the C and L bands and instead of separating channels in series, the C and L bands could be diverted to separate demultiplexers.

Referring again to FIG. 3, demultiplexers 38 and 42 can be selected from a variety of demultiplexing devices, such as various bulk optics demultiplexers. As discussed herein, bulk optics are physical objects such as conventional lenses, mirrors, and diffraction gratings. However, bulk optics do not have to be large. They can be engineered to be very small to be on scale with optical fibers and associated light sources. Even when engineered to be small, however, such systems are still based on the same optical principles as larger bulk optics. Various types of bulk optic demultiplexers can be used within the context of the present invention, including zigzag bulk polymer multiplexer/demultiplexers, diffractive gratings, arrayed waveguide gratings, and the like. These can include both polymer and non-polymer based devices.

For example, a zigzag bulk polymer multiplexer/demultiplexer useful in the present invention is disclosed in copending U.S. application Ser. No. 09/810,433 to Goodman, filed on Mar. 16, 2001, now U.S. Pat. No. 6,542,306 B2 (hereinafter "Goodman"), the disclosure of which is incorporated herein by reference. Goodman discloses a demultiplexer device incorporating an optically transparent optical block seated atop an optically transparent beam-directing member. The transparent optical block includes a plurality of wavelength selective elements, a plurality of reflectors, and a pair of imaging optical elements. During use, a multi-channel beam is directed into the optical block and relayed in a zigzag pattern onto the wavelength selective elements, which separate selected wavelengths from the beam. The separated wavelengths propagate through the beam-directing member and are focused onto optical receptors.

Another zigzag multiplexer/demultiplexer useful in the present invention is disclosed in U.S. Pat. No. 6,008,920 to Hendrix (hereinafter "Hendrix"), which is incorporated herein by reference. Hendrix discloses a multiple channel demultiplexer that includes an optical filter positioned on one side of a wedge-shaped optically transparent block. The optical filter has a wavelength selectivity that changes with changing angles of incidence upon the filter.

Other suitable zigzag bulk polymer multiplexer/demultiplexer devices useful in the present invention are disclosed in U.S. Pat. No. 6,198,864 B1 to Lemoff et al. (hereinafter "Lemoff"), which is incorporated by reference herein. The demultiplexers of Lemoff include a unitary optically transparent structure that utilizes focusing reflecting mirrors to relay a multi-wavelength beam of light among a series of wavelength specific bandpass filters, with each filter separating out a specific wavelength component in the multi-wavelength beam.

Yet another kind of demultiplexer device useful in the invention is based on diffractive gratings. The term "grating" is used to describe almost any device whose operation involves interference among multiple optical signals originating from the same source but with a different relative phase shift. The demultiplexers of the invention can use both transmission and reflection gratings. A transmission grating passes the incident wavelength through the grating plane but at different angles. A reflection grating does not pass the incident wavelengths, but rather the incident wavelengths are reflected at distinct angles of reflection. Optical receptors are positioned to receive the separated wavelength channels.

For example, U.S. Pat. No. 4,470,951 to Lizet et al. (hereinafter "Lizet"), which is incorporated by reference herein, uses gratings arranged in a cascade form under Bragg conditions. Each grating diffracts a portion of the light beam corresponding to an optical signal and transmits the not yet diffracted portion of the beam.

Although not shown in FIG. 3, it should be understood that the multi-wavelength beams may need to be routed to other optical elements within the system. Therefore, the demultiplexer system optionally includes relay mirrors to relay the multi-channel beams to other optical elements.

Figure 6:
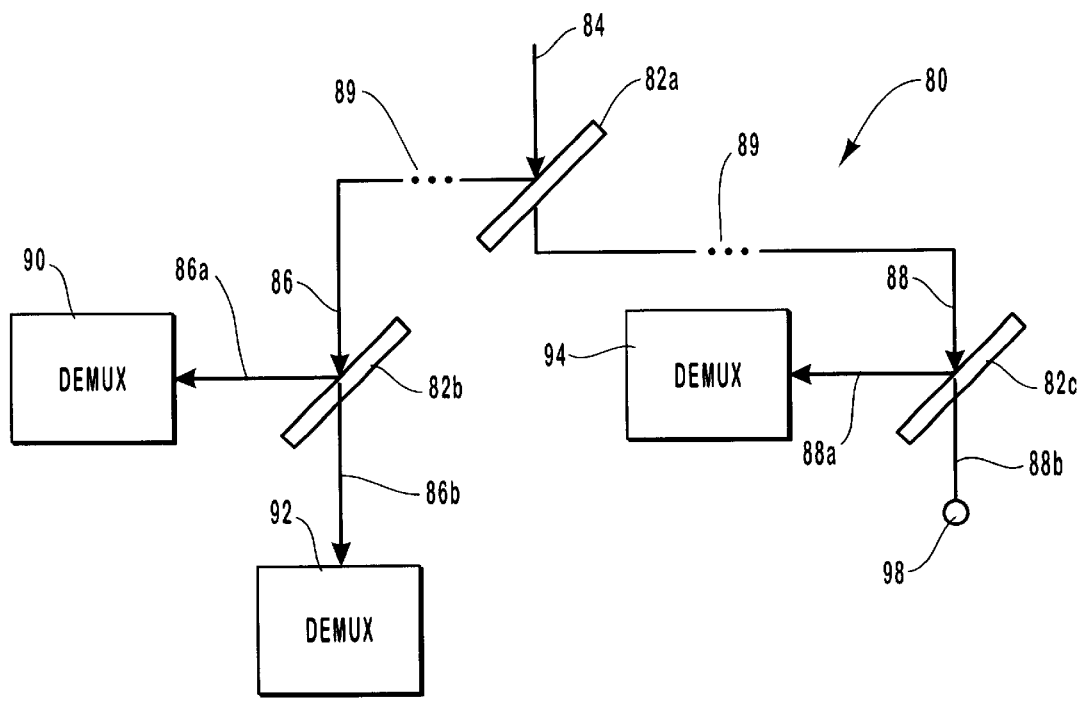
FIG. 6 is a schematic diagram depicting the operation of a demultiplexer system according to another embodiment of the present invention.

FIG. 6 illustrates a further embodiment of the invention in which a demultiplexing system 80 provides multiple parallel demultiplexing of a multi-wavelength beam of optical energy. The demultiplexing system 80 includes a plurality of beam splitters 82*a*, 82*b* and 82*c*, with beam splitter 82*a* being in optical communication with each of beam splitters 82*b* and 82*c*. The beam splitter 82*a* is positioned along the optical path of an input multiple wavelength beam 84. The beam splitter 82*b* is in optical communication with a pair of demultiplexers 90 and 92, while beam splitter 82*c* is in optical communication with a demultiplexer 94. The demultiplexers are positioned with respect to beam splitters 82*b* and 82*c* so as to receive portions of the beam separated by the beam splitters. The demultiplexers and beam splitters of demultiplexing system 80 can be the same as those discussed hereinabove with respect to the embodiment of FIG. 3.

During operation of demultiplexing system 80, beam 84 is directed onto beam splitter 82*a*. The beam splitter 82*a* reflects a portion of beam 84 as a first set of wavelength channels 86, while transmitting another portion of beam 84 as a second set of wavelength channels 88. The first set of wavelength channels 86 is directed to beam splitter 82*b* which reflects a beam portion 86*a* of the channels 86 to demultiplexer 90 while transmitting another beam portion 86*b* to demultiplexer 92. The demultiplexer 90 separates selected wavelengths from beam portion 86*a*, while demultiplexer 92 separates selected wavelengths from beam portion 86*b*. The separated wavelengths can then be directed to appropriate optical receptors (not shown) such as optical detectors.

The second set of wavelength channels 88 is directed to beam splitter 82*c* which reflects a beam portion 88*a* of the channels 88 to demultiplexer 94 while transmitting another beam portion 88b. The demultiplexer 94 separates selected wavelengths from beam portion 88a, which can then be directed to appropriate optical receptors such as optical detectors. The beam portion 88b can comprise a single channel that requires no further demultiplexing, multiple channels, or can be an unused portion of the spectrum. The beam portion 88b can be directed to a demultiplexer when comprised of multiple channels, or to another optical outlet such as output port 98 when beam portion 88b contains an unused portion of the spectrum.

The port 98 can be used as a location for future expansion of demultiplexing system 80. The port 98 can be positioned in various locations in demultiplexing system 80 to accommodate the particular bands to be output. One example of when port 98 would be desirable is when a demultiplexing system requires less than the current range of potential wavelength channels, but future increases in wavelength channel requirements are anticipated. By reserving a portion of the spectrum and implementing an output port, future expansions can avoid the necessity of replacing the entire device by simply connecting an additional demultiplexer or other optical device through port 98.

For instance, an optical network might be initially installed that only has enough traffic to justify three channels, although the fiber optic transmission lines are capable of handling forty channels. The system of the present invention allows initial installation of only those components and associated circuits necessary to handle the planned initial three channels of signal traffic, while allowing expansion and growth as needed, without disrupting the pre-existing signal traffic. The unoccupied channels may be at the high or low end of the potential input signal spectrum, or may be interspersed with occupied channels.

The dotted line segments 89 along the optical path of beams 86 and 88 illustrate that additional beam splitters and demultiplexers can be used in demultiplexing system 80 to further divide the multiple wavelength beam of light into additional beams which have fewer wavelength channels. One skilled in the art will recognize, in light of the disclosure herein, that additional beam splitters and demultiplexers can be provided in an expanding array that greatly increases the demultiplexing potential of the present system, which is not limited to the specific embodiments discussed herein.

The demultiplexing system 80 is capable of separating various numbers of wavelength channels, such as at least 8 or 16 wavelength channels, from the input multiple wavelength beam. For example, system 80 can be configured to separate from 8 to 40 wavelength channels from the input multiple wavelength beam.

Figure 7:
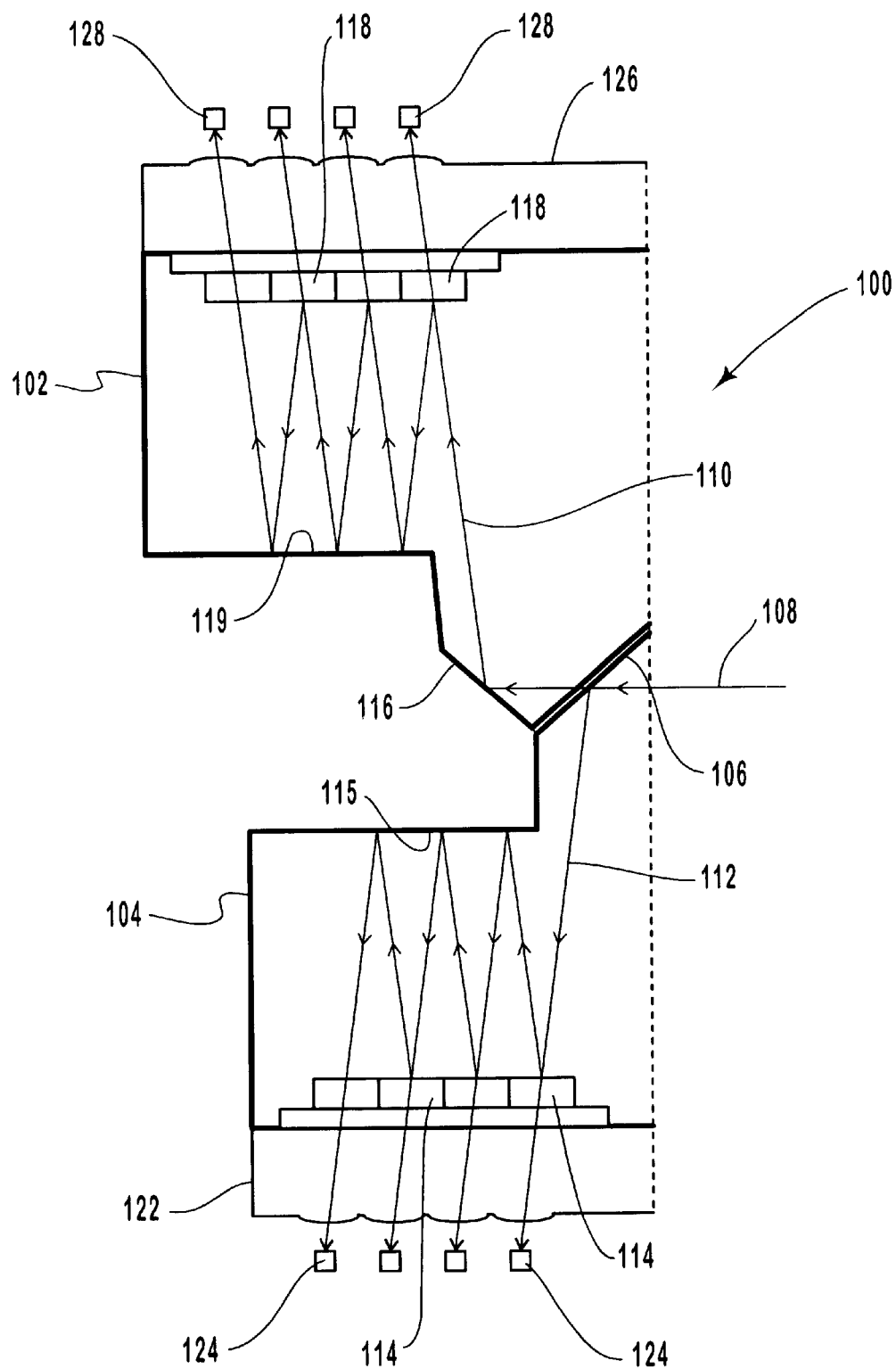
FIG. 7 is a schematic representation of a demultiplexer device according to a further embodiment of the present invention.

In an alternative embodiment, the demultiplexing system of the present invention can be housed in a unitary structure, rather than being a system with interconnected but separate components as discussed above. For example, FIG. 7 depicts a demultiplexing device 100 that includes the various components discussed previously but which is housed in a unitary polymeric optical structure. The device 100 includes a pair of transparent zigzag demultiplexer components 102, 104 that are coupled together. The demultiplexer components 102, 104 are shown as four-channel demultiplexers that provide a zigzag optical path for demultiplexing multiple wavelength channels. It should be understood that the demultiplexer components can be configured to demultiplex greater or fewer numbers of channels.

A beam splitter 106 is interposed between demultiplexer component 102 and demultiplexer component 104 at their respective coupling interfaces. The demultiplexer component 102 includes an array of wavelength selective elements 118 and an opposing reflective surface such as relay mirror or mirrors 119. Similarly, demultiplexer component 104 also includes an array of wavelength selective elements 114 and an opposing reflective surface such as relay mirror or mirrors 115. Each of the wavelength selective elements transmit a selected wavelength band and reflect the remaining wavelengths to an opposing reflective surface so as to propagate the travel of the beam in a zigzag pattern.

The selected wavelength bands transmitted by each wavelength selective element are directed into a monolithic lens array 122 or a monolithic lens array 126 attached to the respective output sides of demultiplexer components 104 and 102 such as by an optical adhesive. The lens array 122 focuses each selected band from demultiplexer component 104 onto a respective optical receptor 124 such as an optical detector or fiber, and lens array 126 focuses each selected band from demultiplexer component 102 onto a respective optical receptor 128.

The demultiplexer components and lens arrays of demultiplexing device 100 are preferably formed primarily of a monolithic material such as a molded plastic or glass material, and are optically transparent over the entire transmitted wavelength range. For example, the demultiplexer components and lens arrays can be formed of a moldable thermoplastic material. Such materials provide the advantage of allowing use of low cost injection molding fabrication techniques, facilitating high volume production at low cost. Further, it is preferable that the demultiplexer components and lens arrays formed of the same material to reduce beam attenuation.

The wavelength selective elements in demultiplexing device 100 can be provided in the form of wavelength selective reflectors, which can be constructed of multilayer interference filters or diffractive optical elements. For example, the wavelength selective reflectors can be bandpass filters, minus filters, edge filters, or interleaving filters. Other suitable examples include graded index interference filters, diffractive structures such as fiber Bragg gratings, and the like. Alternatively, instead of discrete wavelength selective elements, a unitary structure such as a monolithic substrate having a linear variable filter (LVF) or bandpass filter formed thereon can be provided in each of demultiplexer components 102 and 104.

The reflective surfaces in demultiplexer components 102 and 104 can include discrete reflector elements, or can be unitary reflector structures. The reflective surfaces are located and shaped to produce the desired spatial and angular characteristics of a beam that propagates in a zigzag pattern between the wavelength selective elements and the reflective surfaces in demultiplexer components 102 and 104.

In an alternative embodiment, additional wavelength selective elements can be positioned opposite wavelength selective elements 114 and 118 in place of the reflective surfaces in demultiplexer components 102 and 104 so as to reduce the number of reflections and accompanying wavelength attenuation. In this embodiment, additional lens arrays would be placed in optical communication with the additional wavelength selective elements to focus each selected band onto an optical receptor.

A variety of lens structures can be used in the lens arrays attached to demultiplexer components 102 and 104. For example, the lens structures can be convex aspheric lenses, with the convex portion facing outward. The lens structures can be formed as molded surfaces in the monolithic array, or can be optical implants such as GRIN lenses or microlenses. It should be understood that lens arrays 122 and 126 could take the form of a series of discrete lens elements in optical communication with the demultiplexer components.

During operation of demultiplexing device 100, a multi-wavelength beam 108 enters the demultiplexer component 104 and is incident upon beam splitter 106. A first set of wavelength channels 110 is transmitted through beam splitter 106 into demultiplexer component 102, while a second set of wavelength channels 112 is reflected by beam splitter 106 and remains in demultiplexer component 104. The first set of wavelength channels 110 transmitted through beam splitter 106 are reflected by a relay mirror 116 to wavelength selective elements 118 in demultiplexer component 102. The wavelength channels 110 are demultiplexed in a zigzag pattern, and the separated wavelengths are directed by lens array 126 onto optical receptors 128. Similarly, the second set of wavelength channels 112 are reflected by beam splitter 106 to wavelength selective elements 114 in demultiplexer component 104. The wavelength channels 112 are demultiplexed in a zigzag pattern, and the separated wavelengths are directed by lens array 122 onto optical receptors 124. In this manner, an eight-channel beam of optical energy can be demultiplexed by two four-channel demultiplexers operating in parallel.

The present invention provides a compact, cost effective demultiplexing system that can meet the wavelength demultiplexing requirements for a 10 Gb/sec or faster optical transceiver. The demultiplexing devices of the invention are also capable of separating multiple wavelength channels with minimal attenuation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A multiple channel optical demultiplexing system, comprising:
    a beam splitter configured to separate an input multiple wavelength beam into a first multi-wavelength beam and a second multi-wavelength beam, the beam splitter selected from the group consisting of a slab beam splitter, a cube beam splitter, a prism beam splitter, an integrated beam splitting surface, a dichroic beam splitter, and a polarizing beam splitter;
    a first demultiplexer configured to receive and separate the first multi-wavelength beam into a plurality of wavelength channels; and
    a second demultiplexer configured to receive and separate the second multi-wavelength beam into a plurality of wavelength channels.

2. The system of claim 1, wherein at least one of the first or second demultiplexers is selected from the group consisting of a bulk polymer zigzag demultiplexer, a diffractive grating demultiplexer, and an arrayed waveguide grating demultiplexer.

3. A multiple channel optical demultiplexing system, comprising:
    a beam splitter configured to separate an input multiple wavelength beam into a first multi-wavelength beam and a second multi-wavelength beam;
    a first demultiplexer configured to receive and separate the first multi-wavelength beam into a plurality of wavelength channels; and
    a second demultiplexer configured to receive and separate the second multi-wavelength beam into a plurality of wavelength channels;
    wherein at least one of the first or second demultiplexers is selected from the group consisting of a bulk polymer zigzag demultiplexer, a diffractive grating demultiplexer, and an arrayed waveguide grating demultiplexer.

4. The system of claim 3, wherein the beam splitter is selected from the group consisting of a slab beam splitter, a cube beam splitter, a prism beam splitter, and an integrated beam splitting surface.

5. The system of claim 3, wherein the beam splitter is a non-polarizing dichroic beam splitter.

6. A multiple channel optical demultiplexing system, comprising:
    means for separating an input multiple wavelength beam into a first multi-wavelength beam and a second multi-wavelength beam, the separating means selected from the group consisting of a slab beam splitter, a cube beam splitter, a prism beam splitter, an integrated beam splitting surface, a dichroic beam splitter, a polarizing beam splitter, an interleaver, a bandpass filter, a low-pass filter, a high-pass filter, and a fiber Bragg grating filter;
    means for demultiplexing the first multi-wavelength beam into a plurality of wavelength channels; and
    means for demultiplexing the second multi-wavelength beam into a plurality of wavelength channels.

7. The system of claim 6, wherein the system is capable of separating at least about 8 wavelength channels from the input multiple wavelength beam.

8. The system of claim 6, wherein the system is capable of separating at least about 16 wavelength channels from the input multiple wavelength beam.

9. The system of claim 6, wherein the demultiplexing means is selected from the group consisting of a bulk polymer zigzag demultiplexer, a diffractive grating demultiplexer, and an arrayed waveguide grating demultiplexer.

10. A multiple channel optical demultiplexing system, comprising:
    a plurality of beam splitters adapted to separate an input multiple wavelength beam into a plurality of multi-wavelength beam portions;
    a plurality of demultiplexers in optical communication with at least one beam splitter, each of the demultiplexers configured to separate a distinct multi-wavelength beam portion into a plurality of wavelength channels.

11. The system of claim 10, wherein the beam splitters are selected from the group consisting of slab beam splitters, cube beam splitters, prism beam splitters, and an integrated beam splitting surface.

12. The system of claim 10, wherein the beam splitters are non-polarizing dichroic beam splitters.

13. The system of claim 10, wherein at least one of the beam splitters is a non-polarizing trichroic beam splitter that separates the input multiple wavelength beam into a first multi-channel beam and a second multi-channel beam.

14. The system of claim 13, wherein the second multi-channel beam can be further separated into a third multi-channel beam and a fourth multi-channel beam by a beam splitter positioned along the optical path of the second multichannel beam.

15. The system of claim 10, wherein at least one of the demultiplexers is a bulk polymer zigzag demultiplexer.

16. The system of claim 10, wherein at least one of the demultiplexers is a diffractive grating demultiplexer.

17. The system of claim 10, wherein at least one of the demultiplexers is an arrayed waveguide grating demultiplexer.

18. The system of claim 10, further comprising an output port in optical communication with at least one of the beam splitters.

19. The system of claim 10, wherein the system is capable of separating at least about 8 wavelength channels from the input multiple wavelength beam.

20. The system of claim 10, wherein the system is capable of separating at least about 16 wavelength channels from the input multiple wavelength beam.

21. The system of claim 10, wherein the system is capable of separating from about 8 to about 40 wavelength channels from the input multiple wavelength beam.

22. An optical demultiplexing device, comprising:
 a first demultiplexer component configured to separate a first multi-wavelength beam into a plurality of wavelength channels along a zigzag optical path;
 a second demultiplexer component attached to the first demultiplexer component and configured to separate a second multi-wavelength beam into a plurality of wavelength channels along a zigzag optical path; and
 a beam splitter positioned at an interface between the first demultiplexer component and the second demultiplexer component, the beam splitter adapted to separate an input multiple wavelength beam into the first multi-wavelength beam and the second multi-wavelength beam.

23. The device of claim 22, wherein the first demultiplexer component is housed in a polymeric optical structure that includes one or more wavelength selective elements, and one or more reflective surfaces positioned opposite from the wavelength selective elements.

24. The device of claim 22, wherein the second demultiplexer component is housed in a polymeric optical structure that includes one or more wavelength selective elements, and one or more reflective surfaces positioned opposite from the wavelength selective elements.

25. The device of claim 22, wherein the beam splitter is a non-polarizing dichroic beam splitter.

26. The device of claim 22, wherein the beam splitter is a non-polarizing trichroic beam splitter.

27. The device of claim 22, wherein the first demultiplexer component has a reflecting surface configured to direct a transmitted portion of the input multiple wavelength beam to the wavelength selective elements.

28. The device of claim 22, further comprising a first lens array attached to an output side of the first demultiplexer component.

29. The device of claim 28, wherein the first lens array is configured to focus the plurality of wavelength channels separated by the first demultiplexer component onto a plurality of optical receptors.

30. The device of claim 22, further comprising a second lens array attached to an output side of the second demultiplexer component.

31. The device of claim 30, wherein the second lens array is configured to focus the plurality of wavelength channels separated by the second demultiplexer component onto a plurality of optical receptors.

32. The device of claim 22, wherein the device is capable of separating at least about 8 wavelength channels from the input multiple wavelength beam.

33. A method for demultiplexing a multiple wavelength optical energy beam, comprising:
 dividing an input optical energy beam into a plurality of multi-wavelength beams of discrete wavelength ranges, wherein the input optical energy beam is divided by a first beam splitter that separates the input optical energy beam into a first multi-channel beam and a second multi-channel beam;
 dividing the second multi-channel beam into a third multi-channel beam and a fourth multi-channel beam by a second beam splitter positioned along the optical path of the second multichannel beam;
 directing the first, third, and fourth multichannel beams into a plurality of demultiplexers; and
 separating each of the first, third, and fourth multichannel beams into a plurality of optical signal channels.

34. A multiple channel optical multiplexing system, comprising:
 a first multiplexer configured to receive and combine a first plurality of wavelength channels into a first multi-wavelength beam;
 a second multiplexer configured to receive and combine a second plurality of wavelength channels into a second multi-wavelength beam; and
 a beam splitter in optical communication with the first and second multiplexers, the beam splitter adapted to combine the first multi-wavelength beam with the second multi-wavelength beam to produce an output multiple wavelength beam, the beam splitter selected from the group consisting of a slab beam splitter, a cube beam splitter, a prism beam splitter, an integrated beam splitting surface, a dichroic beam splitter, and a polarizing beam splitter.

35. A multiple channel optical multiplexing system, comprising:
 a plurality of multiplexers each of which is configured to combine a plurality of wavelength channels into a multi-wavelength beam; and
 a plurality of beam splitters in optical communication with the plurality of multiplexers, each beam splitter adapted to combine the multi-wavelength beam from a multiplexer in optical communication therewith into an output multiple wavelength beam.

36. The system of claim 35, wherein the beam splitters are selected from the group consisting of slab beam splitters, cube beam splitters, prism beam splitters, and an integrated beam splitting surface.

37. The system of claim 35, wherein the beam splitters are non-polarizing dichroic beam splitters.

38. The system of claim 35, wherein at least one of the beam splitters is a non-polarizing trichroic beam splitter.

39. An optical multiplexing device, comprising:
 a first multiplexer component configured to combine a first plurality of wavelength channels into a first multi-wavelength beam along a zigzag optical path;
 a second multiplexer component attached to the first multiplexer component and configured to combine a second plurality of wavelength channels into a second multi-wavelength beam along a zigzag optical path; and
 a beam splitter positioned at an interface between the first multiplexer component and the second multiplexer component, the beam splitter adapted to combine the first multi-wavelength beam and the second multi-wavelength beam into an output multiple wavelength beam.

40. The device of claim 39, wherein the first multiplexer component is housed in a polymeric optical structure that includes one or more wavelength selective elements, and one or more reflective surfaces positioned opposite from the wavelength selective elements.

41. The device of claim 39, wherein the second multiplexer component is housed in a polymeric optical structure that includes one or more wavelength selective elements, and one or more reflective surfaces positioned opposite from the wavelength selective elements.

42. The device of claim 39, wherein the beam splitter is a non-polarizing dichroic beam splitter.

43. The device of claim 39, wherein the beam splitter is a non-polarizing trichroic beam splitter.

44. The device of claim 40, wherein the first multiplexer component has a reflecting surface configured to direct the first multi-wavelength beam to the beam splitter.

45. The device of claim 40, further comprising a first lens array attached to the first multiplexer component.

46. The device of claim 45, wherein the first lens array is configured to focus a plurality of wavelength channels onto the wavelength selective elements of the first multiplexer component.

47. The device of claim 41, further comprising a second lens array attached to the second multiplexer component.

48. The device of claim 47, wherein the second lens array is configured to focus a plurality of wavelength channels onto the wavelength selective elements of the second multiplexer component.

* * * * *